US012619037B2

(12) United States Patent
Huang et al.

(10) Patent No.: US 12,619,037 B2
(45) Date of Patent: May 5, 2026

(54) INTEGRATED CIRCUIT DEVICE FACILITATING SAME-SIDE OPTICAL AND ELECTRICAL TESTING

(71) Applicant: Taiwan Semiconductor Manufacturing Company, Ltd., Hsinchu (TW)

(72) Inventors: Xin-Hua Huang, Xihu Township (TW); Kuo-Hao Lee, Hsinchu (TW); Jung-Kuo Tu, Hsinchu City (TW); Kejun Xia, Hsinchu City (TW); Tse-En Chang, Hsinchu City (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 386 days.

(21) Appl. No.: 18/488,070

(22) Filed: Oct. 17, 2023

(65) Prior Publication Data

US 2025/0123450 A1 Apr. 17, 2025

(51) Int. Cl.
*G02B 6/42* (2006.01)

(52) U.S. Cl.
CPC ......... *G02B 6/4214* (2013.01); *G02B 6/4239* (2013.01); *G02B 6/4244* (2013.01); *G02B 6/4274* (2013.01)

(58) Field of Classification Search
CPC . G02B 6/30; G02B 6/34; G02B 6/124; G02B 6/4244; G02B 6/4214; G02B 6/4274; G02B 6/12004; G02B 6/4239
See application file for complete search history.

(56) References Cited

U.S. PATENT DOCUMENTS

| | | |
|---|---|---|
| 2017/0102503 A1 | 4/2017 | Israel et al. |
| 2022/0059992 A1* | 2/2022 | Hill ......................... H01S 5/026 |
| 2022/0091349 A1 | 3/2022 | Testa et al. |
| 2022/0179159 A1 | 6/2022 | Wu et al. |
| 2023/0251438 A1 | 8/2023 | Taha et al. |
| 2023/0296853 A9 | 9/2023 | Taha et al. |

* cited by examiner

*Primary Examiner* — Michael P Mooney

(74) *Attorney, Agent, or Firm* — Eschweiler & Potashnik, LLC

(57) ABSTRACT

Some embodiments relate to an integrated circuit (IC) device that includes a first substrate including an optical lens at a frontside surface of the first substrate, an electrical IC structure disposed proximate a backside surface of the first substrate, and a photonic IC structure disposed proximate a backside surface of the electrical IC structure. The photonic IC structure includes a second substrate providing a backside surface of the photonic IC structure; a photodetector, a grating coupler, and an inverse grating coupler disposed over a frontside surface of the second substrate; and a reflector disposed at a frontside surface of the photonic IC structure. The grating coupler and the inverse grating coupler are configured to direct light from the optical lens and the backside surface of the second substrate, respectively, to the photodetector. The reflector is configured to direct light from the inverse grating coupler back to the inverse grating coupler.

20 Claims, 13 Drawing Sheets

400 ⬅

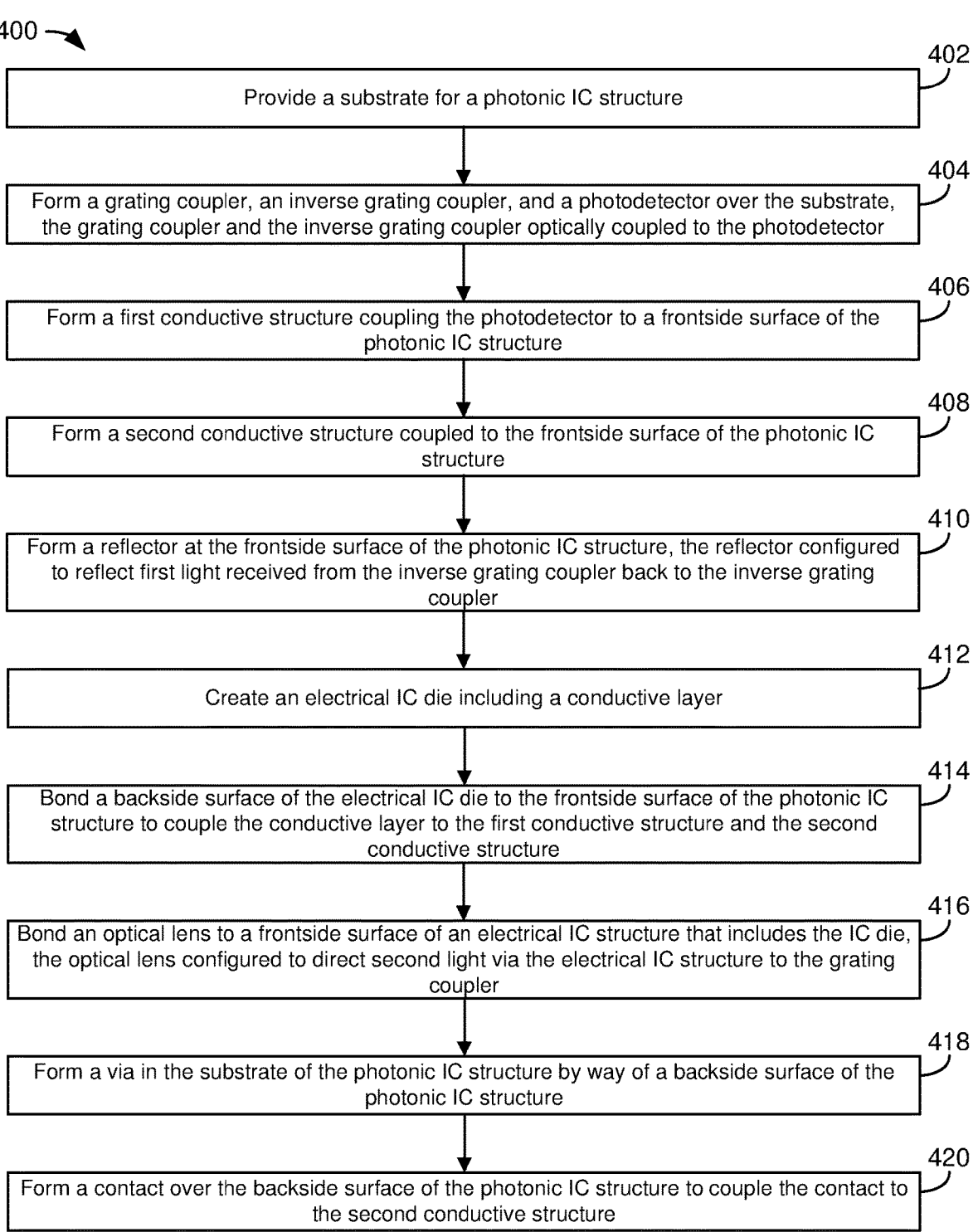

402

Provide a substrate for a photonic IC structure

404

Form a grating coupler, an inverse grating coupler, and a photodetector over the substrate, the grating coupler and the inverse grating coupler optically coupled to the photodetector

406

Form a first conductive structure coupling the photodetector to a frontside surface of the photonic IC structure

408

Form a second conductive structure coupled to the frontside surface of the photonic IC structure

410

Form a reflector at the frontside surface of the photonic IC structure, the reflector configured to reflect first light received from the inverse grating coupler back to the inverse grating coupler

412

Create an electrical IC die including a conductive layer

414

Bond a backside surface of the electrical IC die to the frontside surface of the photonic IC structure to couple the conductive layer to the first conductive structure and the second conductive structure

416

Bond an optical lens to a frontside surface of an electrical IC structure that includes the IC die, the optical lens configured to direct second light via the electrical IC structure to the grating coupler

418

Form a via in the substrate of the photonic IC structure by way of a backside surface of the photonic IC structure

420

Form a contact over the backside surface of the photonic IC structure to couple the contact to the second conductive structure

FIG. 4

INTEGRATED CIRCUIT DEVICE FACILITATING SAME-SIDE OPTICAL AND ELECTRICAL TESTING

BACKGROUND

One result of continued advancement in integrated circuit (IC) technology is the increased integration of electrical and optical functionality in a single IC device. To support such integration, testing of both electrical functions (e.g., using circuit probe (CP) testing) and optical functions of the device (e.g., using a laser for optical testing input) is performed prior to customer delivery to reduce or eliminate the provision of non-functional or poor-performing IC devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 illustrates a methodology of forming an IC device that facilitates same-side electrical and optical testing, in accordance with some embodiments.

DETAILED DESCRIPTION

Figure 1A:
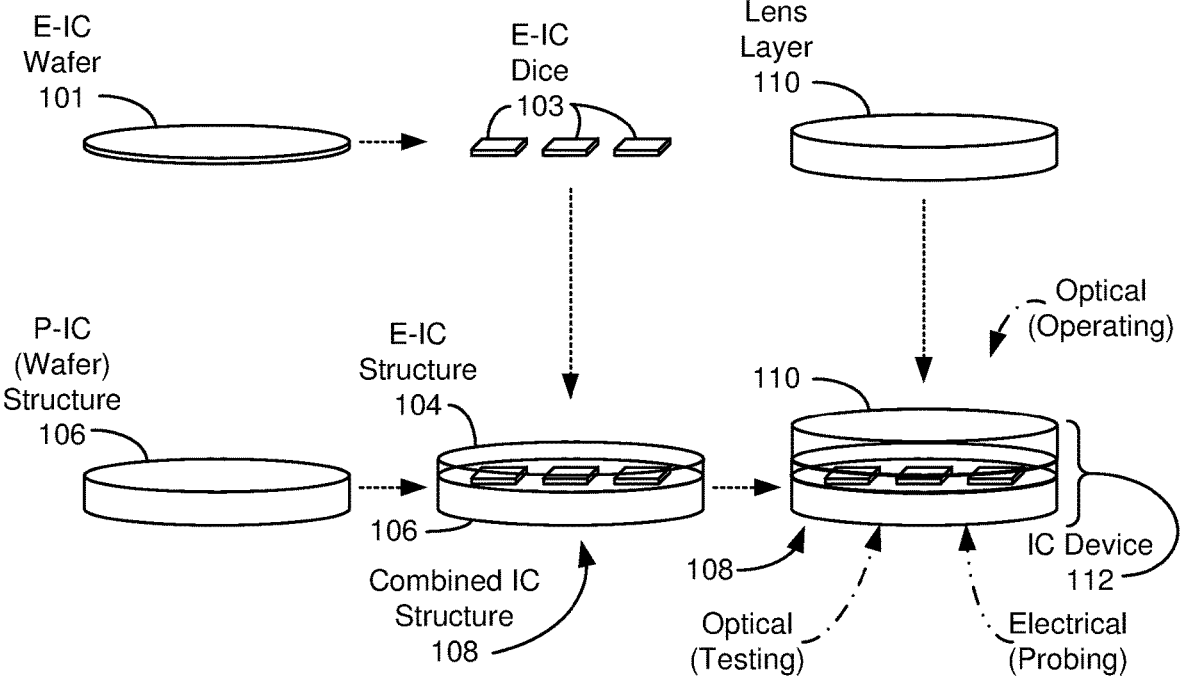
FIG. 1A illustrates a schematic process view of some embodiments of fabrication of an IC device that facilitates same-side electrical and optical testing, according to the present disclosure.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As further integration of optical and associated electrical functions in a single IC device continues, the simultaneous testing of both types of functionality in the device is considered important from both a photonics wafer acceptance test (WAT) point of view and a chip probe (CP) testing perspective. However, this simultaneous testing may be challenging, as accessible electrical input/output (I/O) points may be positioned on an opposite side of the device from the optical I/O locations, and some testing equipment and processes may not be compatible with accessing both sides of the IC device simultaneously. Providing testing optical I/O paths that are on the opposing side of the device from the optical I/O paths used during normal operation may be possible. However, these testing paths may suffer from significant optical signal loss due to undesirable diffraction and scattering effects, thus rendering the associated optical testing less effective.

To address these issues, the present disclosure provides some embodiments of an IC device that facilitates same-side electrical and optical testing. In some embodiments, in addition to a grating coupler that directs light received from an operational optical I/O location to a photodetector, an inverse grating coupler that directs light received from an opposing side of the IC device to the photodetector may be employed in conjunction with a reflector structure that reflects light that passes through and/or bypasses the inverse grating coupler back to the inverse grating coupler, which may then direct the reflected light to the photodetector. Such a structure for the IC device may enhance optical signal power, and thus signal integrity, during device testing.

Accordingly, use of some embodiments of the IC device may provide a more accurate, and hence more useful, same-side simultaneous electrical and optical testing ability that may be performed using currently available testing systems. In some embodiments, this testing ability may result in a more accurate determination of chip yield and more precise monitoring of IC process health.

FIG. 1A illustrates a schematic process view of some embodiments of fabrication of an IC device 112 that facilitates same-side electrical and optical testing, according to the present disclosure. As is described in greater detail below, in some embodiments, an electrical IC (E-IC) wafer 101 (e.g., a semiconductor wafer including one or more electrical circuits) and a photonic IC (P-IC) structure 106 (e.g., an optical wafer including one or more photonic structures and associated circuitry) may be fabricated or provided. After singulating the E-IC wafer 101 into multiple E-IC dice 103, the E-IC dice 103 may be bonded or otherwise attached to P-IC structure 106 and further supplemented to form an E-IC structure 104 that, with P-IC structure 106, results in a combined IC 108. To then render the combined IC 108 optically operational, a lens structure or lens layer 110 may then be bonded or attached to the combined IC 108 to produce the IC device 112. As shown in FIG. 1A, the side (e.g., top or frontside) of the IC device 112 associated with the lens layer 110 provides the operating optical path, while the other side (e.g., bottom or backside) of the IC device 112 facilitates same-side testing access by providing contacts for electrical probing and a testing optical path.

Figure 1B:
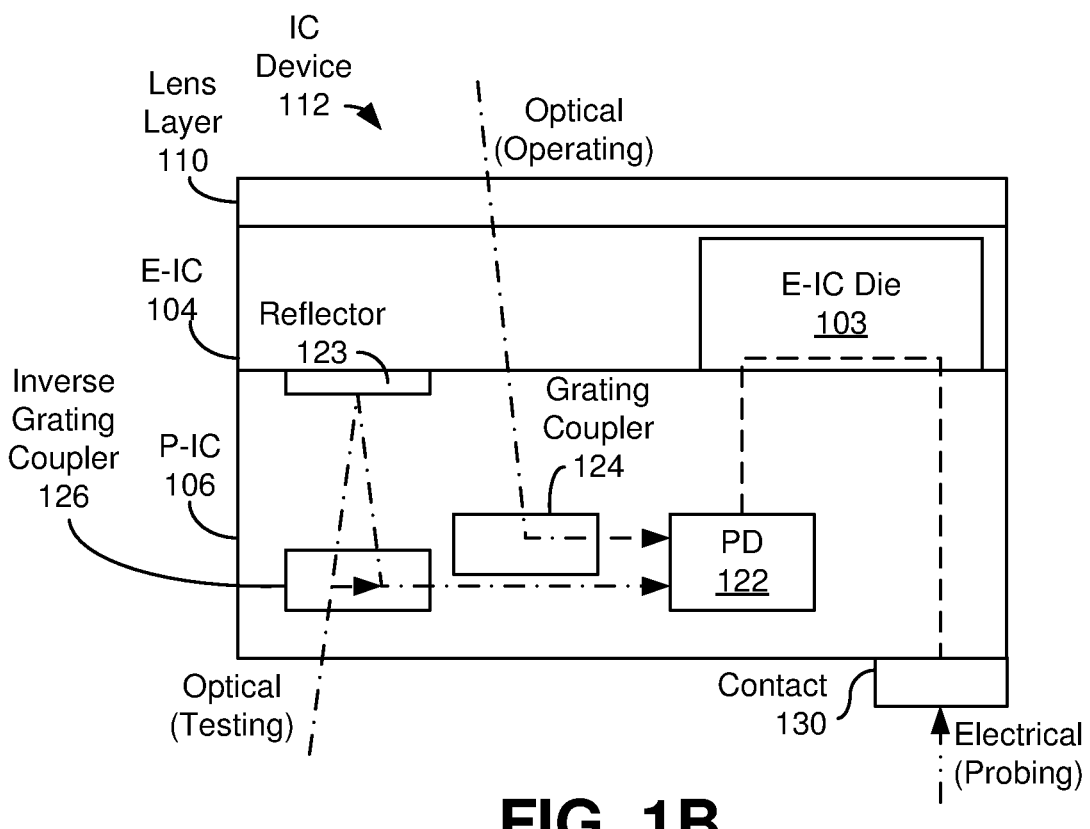
FIGS. 1B and 1C illustrate a schematic side view and a schematic plan view, respectively, of some embodiments of an IC device that facilitates same-side electrical and optical testing, according to the present disclosure.
Figure 1C:
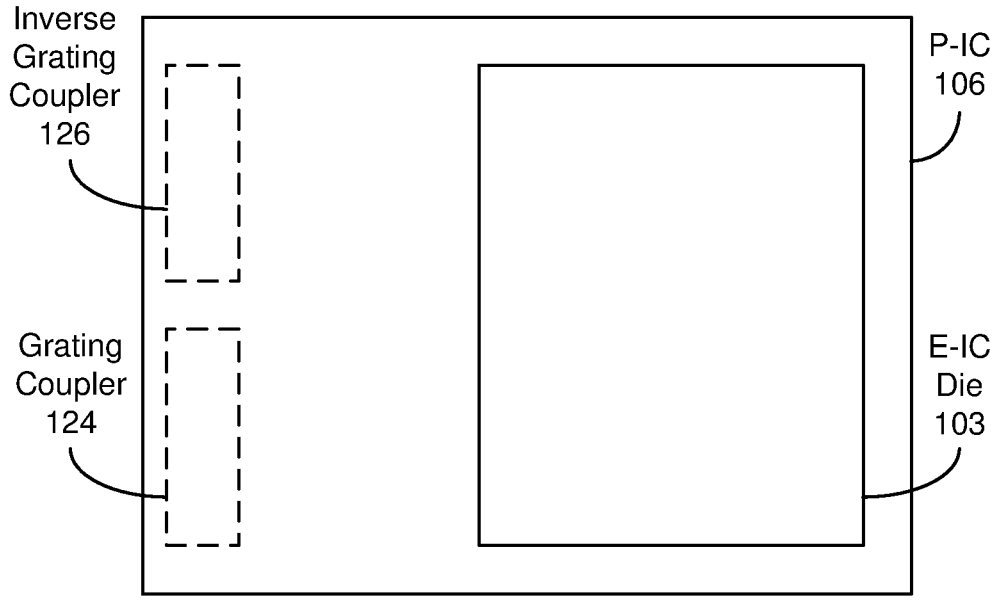

FIGS. 1B and 1C illustrate a schematic side view and a schematic plan view, respectively, of some embodiments of the IC device 112, according to the present disclosure. As illustrated in FIG. 1B, E-IC structure 104 (including E-IC die 103), P-IC structure 106, and lens layer 110 are attached or bonded together as indicated in FIG. 1A.

In some embodiments, P-IC structure 106 may include a grating coupler 124, an inverse grating coupler 126, a reflector 123, and a photodetector (PD) 122. As shown in FIG. 1B, the grating coupler 124 may be configured to receive light via the lens layer 110, the E-IC structure 104, and the P-IC structure 106, and then direct that light to the PD 122 (e.g., via a waveguide or similar structure not shown in FIG. 2). In some embodiments, the lens layer 110 may include a lens structure (e.g., at a top or frontside surface of the lens layer 110) that directs and/or focuses light received at the lens structure to the grating coupler 124.

Additionally, in some embodiments, the inverse grating coupler 126 may be configured to receive light via a bottom or backside surface of the P-IC structure 106 and direct it to the PD 122. Also, in some embodiments, some of that received light may pass through the inverse grating coupler 126. To recover that light, the reflector 123 may be configured to reflect or direct the light it receives via the inverse grating coupler 126 back to the inverse grating coupler 126, which, in turn, may also be configured to direct the reflected light to the PD 122. Consequently, the reflector 123 may increase the testing optical signal received at the bottom or backside of the P-IC structure 106, as received at the PD 122, to a useful level.

Also shown in FIG. 1B, in some embodiments, is a contact 130 that is electrically connected to the PD 122. In some embodiments, the contact 130 may be an electrical contact suitable for engagement by a circuit probe (CP) test system. In some embodiments, the contact is electrically coupled to the PD 122 by way of one or more conductive structures or layers in the P-IC structure 106 and the E-IC structure 104 to facilitate connection by way of circuitry in the E-IC structure 104 (e.g., circuity that is coupled to the PD 122). Consequently, in some embodiments, the contact 130, as well as the inverse grating coupler 126, the reflector 123, and the PD 122, may enable same-side simultaneous optical and electrical testing of the IC device 112 while allowing the reception of operational optical signals via the lens layer 110 of the opposite (e.g., top or frontside) of the IC device 112.

The schematic plan view of FIG. 1C depicts E-IC die 103 as being bonded to a top or frontside surface of the P-IC structure 106. In addition, in some embodiments, within the P-IC structure 106, the grating coupler 124 and the inverse grating coupler 126 may reside in different lateral locations. Accordingly, in some embodiments, while the grating coupler 124 and the inverse grating coupler 126 are shown in FIG. 1B as being offset in a vertical direction (e.g., in a direction perpendicular to the plan view of FIG. 1C), the grating coupler 124 and the inverse grating coupler 126 may instead lie in the same or similar range of positions in the vertical direction.

Figure 2:
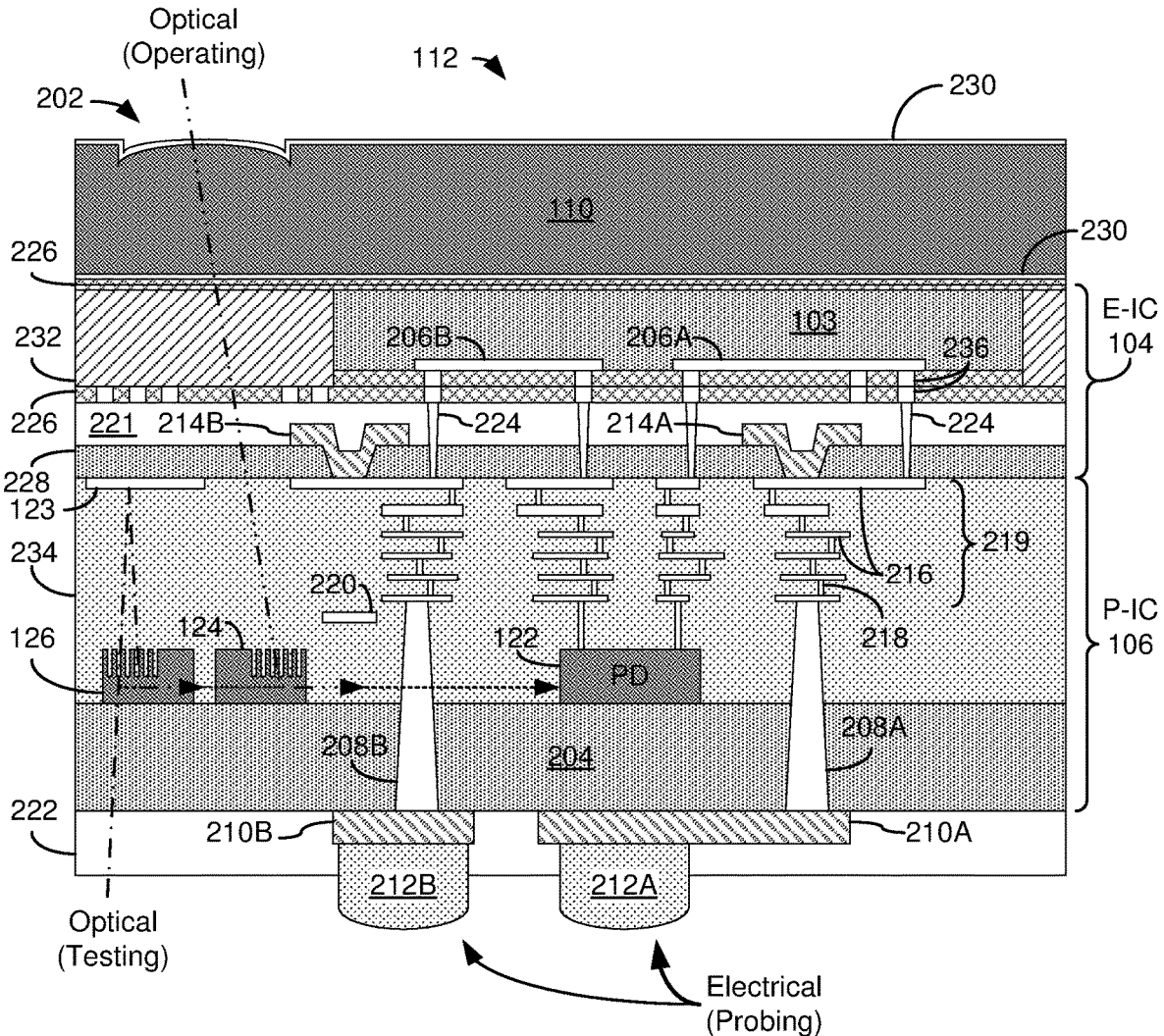
FIG. 2 illustrates a structural side view of some embodiments of an IC device that facilitates same-side electrical and optical testing, according to the present disclosure.

FIG. 2 illustrates a structural side view of some embodiments of the IC device 112 that facilitate same-side electrical and optical testing, according to the present disclosure. As illustrated in a manner similar to that of FIG. 1B, the IC device 112 may include the lens layer 110, the E-IC structure 104, and the P-IC structure 106 bonded together, with the lens layer 110 being positioned at a top or frontside position, and the P-IC structure 106 being positioned at a bottom or backside position, of the IC device 112.

In some embodiments, the lens layer 110 may include a substrate (e.g., a silicon substrate) that includes a lens or lens structure 202 that is etched or otherwise formed into a top or frontside surface of the substrate. While the lens 202 is depicted as a spherical convex lens to focus the light received thereat to the grating coupler 124 of the P-IC structure 106, other shapes for the lens 202 may be provided in other embodiments. Also, in some embodiments, the lens layer 110 may be coated or otherwise covered with a protective layer or coating 230. Further, in some embodiments, a dielectric layer 226 (e.g., silicon dioxide ($SiO_2$), another form of silicon oxide ($SiO_x$), or another dielectric material) may be formed at a bottom or backside surface of lens layer 110 and a top or frontside surface of E-IC structure 104 to bond the two surfaces together. Also, in some embodiments, lens layer 110 may be approximately 600-1000 microns ($\mu$m) thick, and approximately 775 $\mu$m thick in some embodiments.

The E-IC structure 104 may include E-IC die 103 that provides electrical and/or electronic circuitry (e.g., providing electrical functionality associated with the optical functionality of IC device 112), which may be connected to one or more conductive layers, such as a first conductive layer 206A and a second conductive layer 206B. E-IC die 103 may be one of multiple E-IC dice 103 coupled to P-IC structure 106, as shown in FIG. 1A.

To attach the individual E-IC dice 103 to P-IC structure 106, a dielectric layer 228 may be disposed over P-IC structure 106. Further, in some embodiments, one or more bond pads 214A and 214B (e.g., aluminum bond pads (APs)) may be formed through and atop dielectric layer 228 to couple to a metal layer 216 (e.g., an uppermost metal layer) of P-IC structure 106 to facilitate bonding of E-IC structure 104 to P-IC structure 106. In addition, in some embodiments, a passivation layer 221 may be disposed over dielectric layer 228 and bond pads 214A and 214B, such as to provide a planar surface for a subsequent dielectric layer 226 to use in conjunction with a corresponding dielectric layer 226 of E-IC die 103 to bond E-IC die 103 with the P-IC structure 106.

Prior to such bonding, in some embodiments, a plurality of vias 224 may be formed in the passivation layer 221 and dielectric layer 228, and an associated plurality of bond pad metal structures (BPMs) 236 (e.g., copper (Cu) or another conductive material) may be formed in the dielectric layers 226. This resulting structure may be employed to bond E-IC die 103 to P-IC structure 106 (e.g., at one temperature to bond dielectric layers 226 and at a higher temperature to anneal BPMs 236, such as in the process employed in System on Integrated Chips (SoIC) technology).

In some embodiments, after the bonding of E-IC die 103 to P-IC structure 106, voids that may exist between individual E-IC dice 103 may be filled, such as by way of a fill dielectric 232 (e.g., $SiO_2$, $SiO_x$, or another dielectric material), such as to provide a stable surface in combination with E-IC die 103 to form E-IC structure 104 for application of the dielectric layer 226 (e.g., for bonding to lens layer 110).

The P-IC structure 106, as described above, includes a substrate 204 (e.g., silicon or another material) upon which the remainder of P-IC structure 106 may be disposed, including PD 122, grating coupler 124, inverse grating coupler 126, and reflector 123 described above. In some embodiments, PD 122, grating coupler 124, and inverse grating coupler 126 may be disposed proximate (e.g., directly over) substrate 204. As depicted in FIG. 2, PD 122, grating coupler 124, and inverse grating coupler 126 are shown from a schematic perspective, and thus are not intended to be accurate physical representations of those structures.

In some embodiments, PD 122 may be a photodiode, a phototransistor, or another optical detector component configured to output an electrical signal that is representative of a received optical signal. Each of grating coupler 124 and the inverse grating coupler 126 may be optically coupled to PD 122, such as by way of a waveguide or other optical structure (not shown in FIG. 2). In addition, PD 122 may be coupled to one or more conductive structures 219, which may include a number of metal layers 216 and interconnecting vias 218. While any number of conductive structures 219 may be coupled to PD 122 in other embodiments, FIG. 2 illustrates two such conductive structures 219 that may be separately connected to different portions of the PD 122 (e.g., a control input and a signal output). The two conductive structures 219 may thus couple PD 122 to one or more portions of E-IC die 103 by way of vias 224, BPMs 236, and conductive layers 206A and 206B.

In some embodiments, grating coupler 124 may operate as a diffraction grating, including associated diffraction elements, that operate to direct light received via lens 202 into a waveguide or other optical structure toward PD 122 (e.g., generally along a plane defined by P-IC structure 106). Further, in some embodiments, grating coupler 124 may include diffraction elements of a first material (e.g., epitaxial silicon) and spaces therebetween of a second material (e.g., a dielectric material, such as $SiO_2$ or $SiO_x$). In addition, in some embodiments, the diffraction elements may generally extend toward the direction from which light is expected to be received (e.g., toward the lens layer 110).

Correspondingly, inverse grating coupler 126 may operate as a diffraction grating with associated diffraction elements operating to direct light received via substrate 204 into a waveguide or other optical structure for transmission to PD 122. In some embodiments, inverse grating coupler 126 may include diffraction elements of the second material (e.g., the same material as that employed for the inter-element spaces of the grating coupler 124, such as $SiO_x$ or another dielectric material) and spaces therebetween of a third material (e.g., polycrystalline silicon). In addition, the diffraction elements of the inverse grating coupler 126 may extend toward the substrate 204, and thus in a direction generally opposite to the direction in which the diffraction elements of the grating coupler 124 extend. Accordingly, in some embodiments, one or both of the structure materials and orientations of the grating coupler 124 and the inverse grating coupler 126 oppose, or are inverse, to each other.

Disposed over at least portions of the grating coupler 124, inverse grating coupler 126, and PD 122 may be one or more dielectric layers 234 (e.g., interlayer dielectric (ILD), such as $SiO_x$ or another dielectric material). The dielectric layers 234, during fabrication, may also determine the locations of the metal layers 216 of the conductive structures 219.

Also, in addition to the two conductive structures 219 coupled with the PD 122, as mentioned above, two additional conductive structures 219 may be provided in P-IC structure 106 and coupled by way of vias 224 and associated BPMs 236 to conductive layers 206A and 206B, such as to provide electrical connections for electrical probing via the bottom or backside of the IC device 112.

As depicted in FIG. 2, the P-IC structure 106 may also include an additional metal level or structure, MH 220, which in some embodiments may be located closer to the substrate 204 relative to the various metal layers 216 included in the P-IC structure 106 discussed above. In some embodiments, MH 220 may be employed as a metal heater (e.g., to control the temperature of P-IC structure 106). In some embodiments, MH 220 may include, but is not limited to, one or more of titanium (Ti), titanium nitride (TiN), tungsten (W), or nickel chromium (NiCr).

In some embodiments, the reflector 123 may be disposed at or proximate a top or frontside surface of the P-IC structure 106 and positioned over the inverse grating coupler 126. In some embodiments, the reflector 123 may be aligned with one of the metal layers (e.g., an uppermost metal layer 216 of the P-IC structure 106). Also, in some embodiments, the reflector 123 may completely or substantially cover the inverse grating coupler 126 in a plan view of the IC device 112. Examples of the inverse grating coupler 126 are discussed in conjunction with FIGS. 7A-7C below.

In some embodiments, reflector 123 may include a metal (e.g., titanium (Ti)), a metal alloy (e.g., an aluminum-copper (AlCu) alloy), or another reflective material. Further, in some embodiments, the thickness of reflector 123 may range from 1000 to 14000 angstroms. Additionally, the width and/or the length of reflector 123 in a plan view of the IC device 112 may range from 10 to 200 μm in some embodiments, and range from 20 to 100 μm in other embodiments.

Also in the P-IC structure 106, in some embodiments, at least one via (e.g., a through-dielectric via (TDV)) may be configured to couple a corresponding conductive structure 219 to a bottom or backside surface of the P-IC structure 106. While FIG. 2 illustrates two vias 208A and 208B, other embodiments may employ any number of similar vias. In addition, each of a corresponding number of pads (e.g., aluminum bond pads (APs)) 210A and 210B may be disposed over a bottom or backside surface of substrate 204, and a corresponding one or more contacts (e.g., controlled-collapse chip connections C4s)) 212A and 212B may be disposed over pads 210A and 210B, respectively. In some embodiments, a protective layer 222 may also be disposed over the bottom or backside of substrate 204 (e.g., to protect the pads 210A and 210B while leaving a portion of the contacts 212A and 212B exposed, such as for CP testing). Such a structure provides one or more electrical connections with PD 122 that are accessible by way of the bottom or backside surface of the P-IC structure 106. For example, each of contacts 212A and 212B may be electrically connected with a corresponding portion of E-IC die 103 (e.g., a circuit that provides a control signal for PD 122 and a circuit that receives an output signal of PD 122) such that controlling and monitoring of PD 122 may be performed in synchronization with application of an optical test signal via the backside of P-IC structure 106.

Consequently, in some embodiments, using the structure of IC device 112 depicted in FIG. 2, while an operating optical path is provided via lens 202, simultaneous optical and electrical testing of the IC device 112 is facilitated at a bottom or backside of the IC device 112 via a testing optical path via substrate 204, inverse grating coupler 126, and reflector 123, and via an electrical probing interface via contacts 212A and 212B. Further, in some embodiments, the use of the reflector 123 may enhance the optical signal strength associated with the optical testing path that includes the inverse grating coupler 126 to render the resulting testing results useful.

FIGS. 3A-3G illustrate cross-sectional views of some embodiments of an IC device (e.g., IC device 112) facilitating backside optical and electrical testing at various stages of manufacture. Although FIGS. 3A-3G are described as a series of acts, it will be appreciated that these acts are not limiting in that the order of the acts can be altered in other embodiments, and the methods disclosed are also applicable to other structures. In other embodiments, some acts that are illustrated and/or described may be omitted in whole or in part.

Figure 3A:
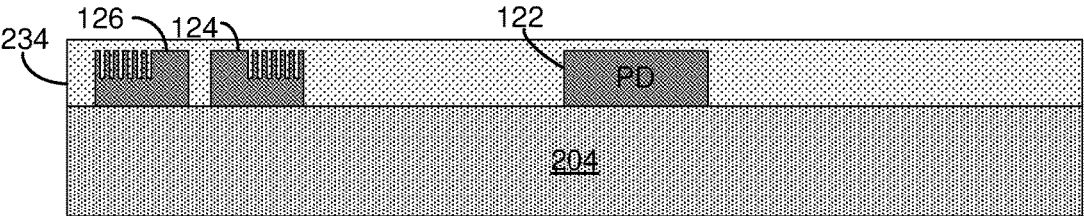
FIGS. 3A through 3G illustrate side views of some embodiments of an IC device that facilitates same-side electrical and optical testing at various stages of manufacture, according to the present disclosure.

FIG. 3A illustrates a substrate 204 (e.g., a silicon substrate) over which a PD 122, a grating coupler 124, and an inverse grating coupler 126 (e.g., as described above) are formed, along with one or more dielectric layers 234 (e.g., SiO$_x$ or another dielectric material) encompassing PD 122, grating coupler 124, and inverse grating coupler 126. FIGS. 51-5F, relating to embodiments for fabricating these components, are discussed in detail below.

Figure 3B:
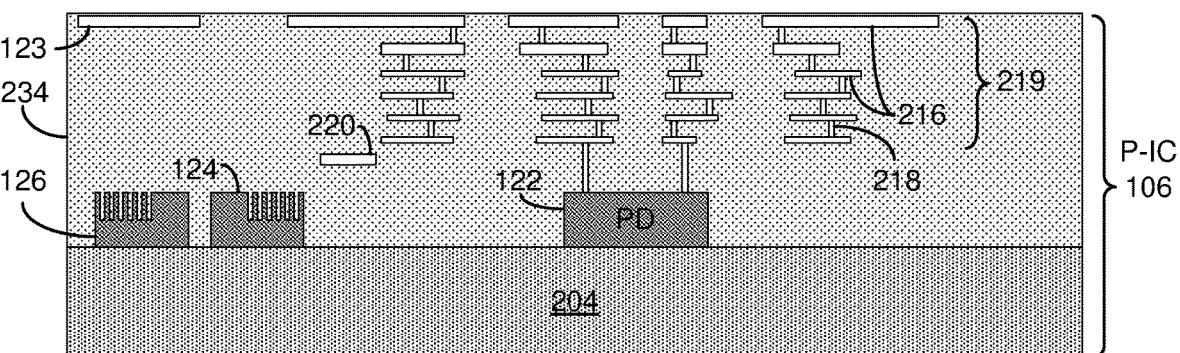

FIG. 3B illustrates the forming (e.g., deposition) of a plurality of metal layers 216 and interconnecting vias 218 among additional dielectric layers 234 to create one or more conductive structures 219. In the example of FIG. 3B, two of the conductive structures 219 are coupled with PD 122. As also shown in FIG. 3B, in some embodiments, an additional metal layer MH 220 may be formed (e.g., at a level lower that the lowermost metal layer of the metal layers 216). Additionally, in some embodiments, a reflector 123 is formed (e.g., deposited) over inverse grating coupler 126. In some embodiments, reflector 123 is formed at the same time as, and thus may lie in the same plane as, an uppermost metal layer 216 depicted in FIG. 3B. The resulting structure shown in FIG. 3B is a P-IC structure 106, as described above.

Figure 3C:
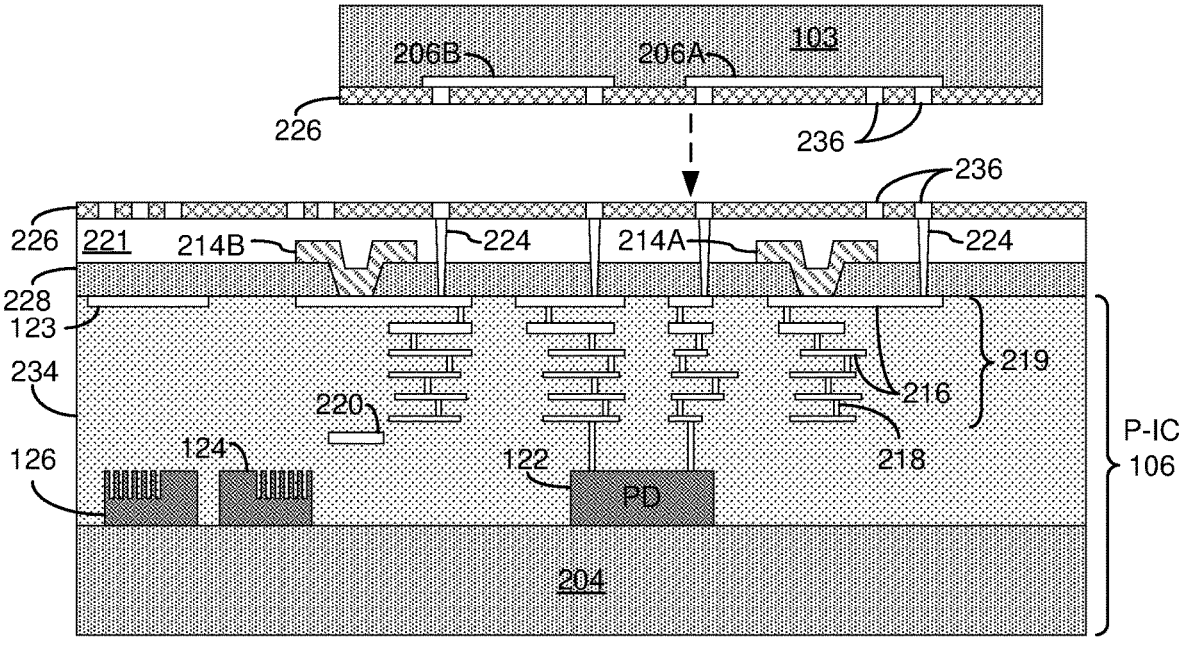

FIG. 3C illustrates the forming of layers over the P-IC structure 106 in preparation for bonding the P-IC structure 106 to an E-IC die 103 of an E-IC structure 104. In some embodiments, a dielectric layer 228 (e.g., SiO$_x$ or another dielectric material) may be formed (e.g., deposited) over a frontside surface of the P-IC structure 106 and thereafter etched (e.g., by photolithography or another etching process) to expose a portion of an uppermost one or more metal layers 216 (e.g., those uppermost metal layers 216 included in the conductive structures 219 connected to PD 122). Thereafter, bond pads 214A and 214B (e.g., APs) may be formed over the corresponding exposed portions of each metal layer 216, such as by way of conformal deposition of a metal (e.g., aluminum or another conductive material) over dielectric layer 228, followed by etching (e.g., using photolithography) to remove those portions of the metal not included in bond pads 214A and 214B.

Thereafter, a passivation layer 221 (e.g., a dielectric material) may be deposited over dielectric layer 228 and bond pads 214A and 214B. Also, in some embodiments, a plurality of vias 224 may be formed (by way of etching and subsequent deposition of a conductive material, such as copper) to extend from a frontside surface of passivation layer 221, through dielectric layer 228, to the uppermost metal layer 216 of a plurality of conductive structures 219, including the conductive structures 219 coupled with PD 122.

Over passivation layer 221, a dielectric layer 226 may be formed (e.g., deposited) and a plurality of bond pad metal structures (BPMs) 236 may be formed therein (e.g., via etching and subsequent deposition). In embodiments, each of some number of BPMs 236 may be formed over, and connect with, a corresponding one of vias 224. In some embodiments, the resulting upper surface of dielectric layer 226 and associated BPMs 236 may be planarized (e.g., via chemical-mechanical planarization (CMP)).

Also shown in FIG. 3C is an E-IC die 103 that includes electrical circuitry (not shown in FIG. 3C) having a backside surface that is to be bonded to the frontside surface of P-IC structure 106. In some embodiments, E-IC die 103 is coupled to one or more conductive layers 206A and 206B. In some embodiments, a dielectric layer 226 with a plurality of BPMs 236 are formed on a backside surface of E-IC die 103 such that each of at least some of BPMs 236 contacts one of conductive layers 206A and 206B. Further, in some embodiments, each of at least some of BPMs 236 connected to E-IC die 103 are laterally aligned to contact with a corresponding BPM 236 at the frontside surface of P-IC structure 106.

Figure 3D:
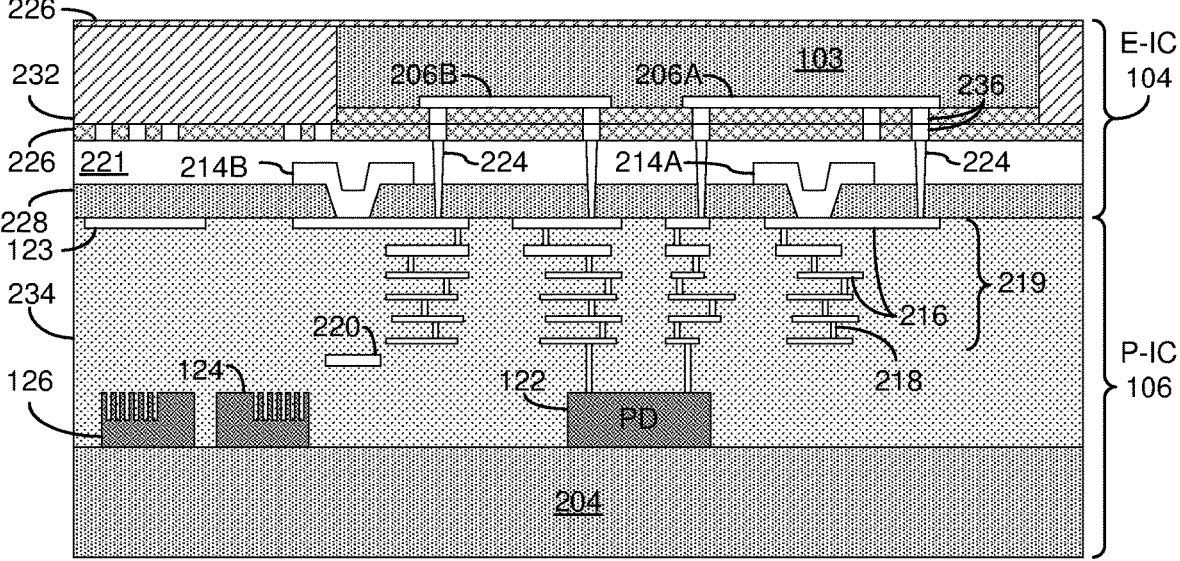

FIG. 3D illustrates the joining (e.g., bonding) of E-IC die 103 with P-IC structure 106 (e.g., by way of SoIC technology, as described above). In some embodiments, for example, dielectric layers 226 of E-IC die 103 and P-IC structure 106 may be bonded together (e.g., at a first temperature), and the BPMs 236 of E-IC die 103 and P-IC structure 106 may be joined (e.g., at a second temperature higher than the first temperature) to bond E-IC die 103 to P-IC structure 106. In some embodiments, multiple such E-IC dice 103 as that shown in FIG. 3D may also be bonded to other portions of P-IC structure 106. Further, a fill dielectric 232 may be deposited in voids over P-IC structure 106 that are not occupied by E-IC die 103 (e.g., spaces remaining between multiple E-IC dice 103) to form a substantially planar surface provided by E-IC die 103 and fill dielectric 232. In some embodiments, another dielectric layer 226 may be formed (e.g., deposited) over the substantially planar surface, resulting in an E-IC structure 104 bonded to P-IC structure 106.

Figure 3E:
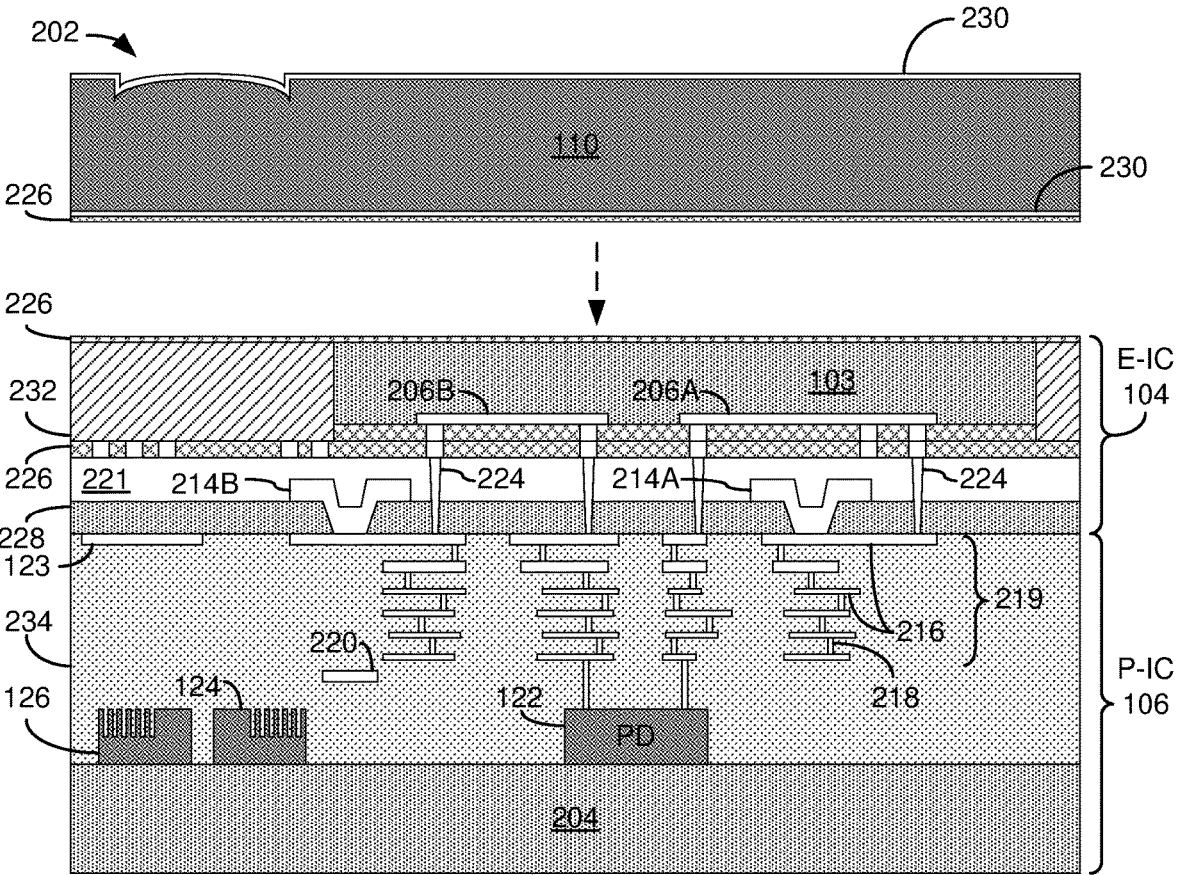

FIG. 3E illustrates a lens layer 110 (e.g., a substrate made of silicon or another material) incorporating a lens 202. In some embodiments, the lens 202 may be formed (e.g., etched or molded) into a frontside surface of the lens layer 110. While lens 202, as illustrated in FIG. 3E, may be a cylindrical convex lens, lens 202 may be shaped as another type of lens in other embodiments. In addition, in some embodiments, a protective layer or coating 230 may be formed (e.g. deposited) over at least one of the frontside surface or the backside surface of the lens layer 110. Further, in some embodiments, a dielectric layer 226 (e.g., SiO$_x$ or another dielectric material) may be deposited over the backside surface of lens layer 110 in preparation for bonding with a corresponding dielectric layer 226 at the frontside surface of E-IC structure 104.

Figure 3F:
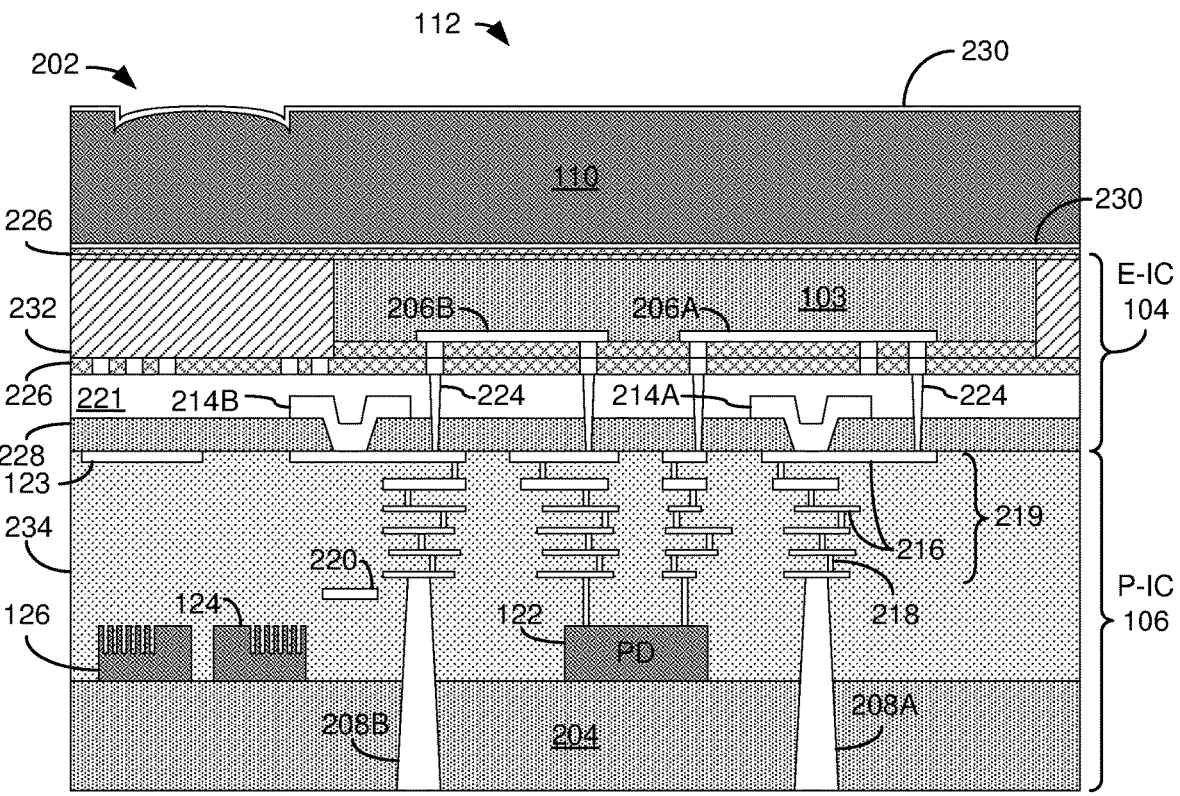

FIG. 3F illustrates IC device 112 after the bonding of lens layer 110 with E-IC structure 104. As also shown in FIG. 3F, each of a plurality of vias (e.g., TSVs) 208A and 208B are formed (e.g., via etching and subsequent deposition) from a conductive material (e.g., copper or another metallic material) through substrate 204 and some of dielectric layers 234 to electrically connect to a lowermost metal layer 216 of a corresponding conductive structure 219 connected with an associated conductive layer 206A and 206B of E-IC structure 104.

Figure 3G:
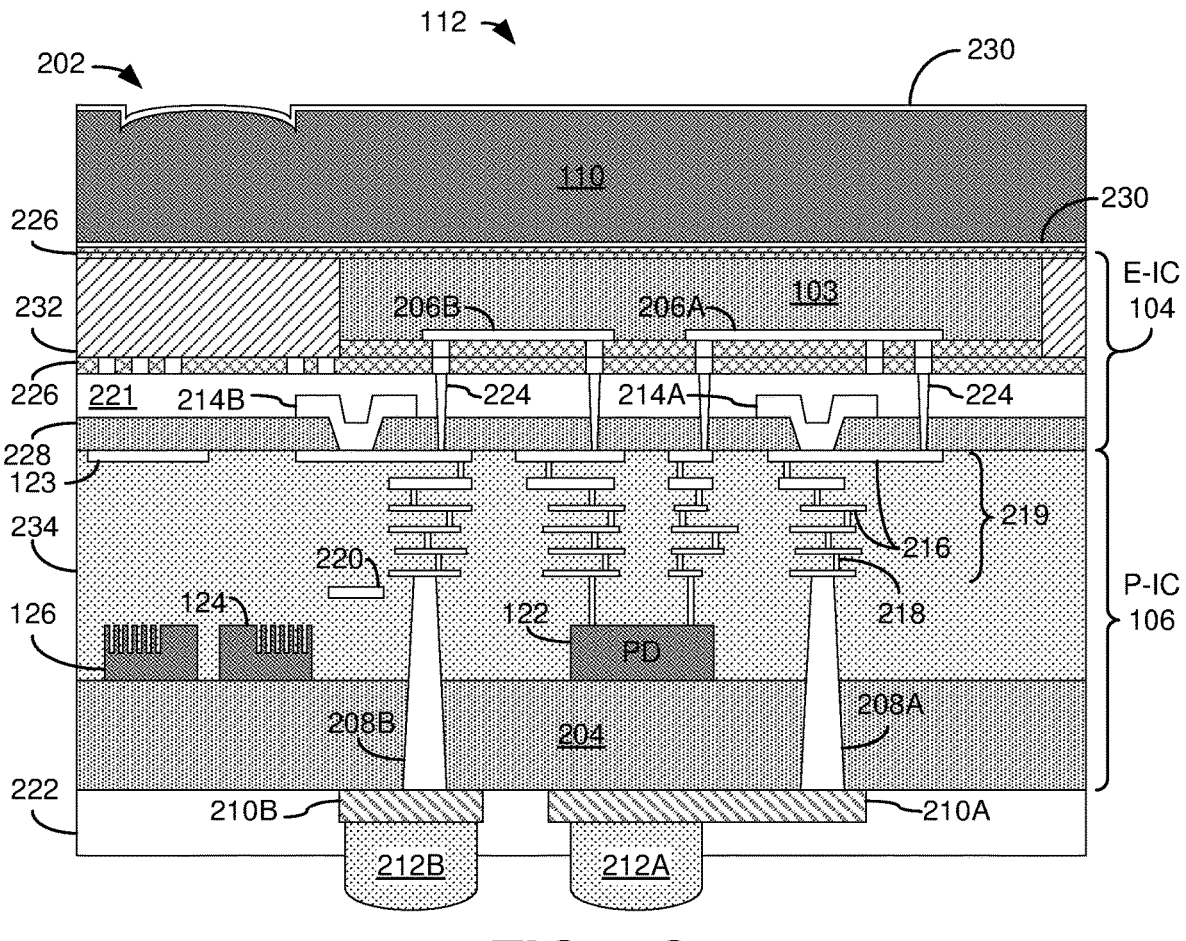

FIG. 3G illustrates the forming (e.g., by deposition and subsequent etching) of conductive pads (e.g., APs) 210A and 210B over a backside surface of substrate 204, each of which connects with a corresponding one of vias 208A and 208B. Thereafter, each of a plurality of contacts (e.g., C4s)) 212A and 212B may be formed over a corresponding one of pads 210A and 210B. In some embodiments, a protective layer 222 (e.g., a dielectric material) may also be disposed over the backside of the substrate 204 (e.g., to protect pads 210A and 210B while leaving a portion of contacts 212A and 212B exposed, such as for electrical probing), as discussed above.

FIG. 4 illustrates a methodology 400 of forming an IC device (e.g., IC device 112) that facilitates same-side optical and electrical testing, in accordance with some embodiments. Although this method and other methods illustrated and/or described herein are illustrated as a series of acts or events, it will be appreciated that the present disclosure is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

Acts 402 through 420 may correspond, for example, to the structure previously illustrated in FIGS. 3A through 3G in some embodiments. At Act 402, for example, a substrate (e.g., substrate 204 of FIG. 3A) for a photonic IC structure (e.g., P-IC structure 106 of FIG. 3B) may be provided. At Act 404, a grating coupler (e.g., grating coupler 124 of FIG. 3A), an inverse grating coupler (e.g., inverse grating coupler 126 of FIG. 3A), and a photodetector (e.g., PD 122 of FIG. 3A) are formed over the substrate. In some embodiments, the grating coupler and the inverse grating coupler are optically coupled to the photodetector. FIG. 3A illustrates a cross-sectional view of some embodiments corresponding to Acts 402 and 404. Also, some embodiments of the substrate, as well as the fabrication of the grating coupler and the inverse grating coupler, are discussed more fully below in relation to FIGS. 5A-5F and FIG. 6.

At Act 406, a first conductive structure (e.g., conductive structure 219 of FIG. 3B) coupling the photodetector to a frontside surface of the photonic IC structure is formed. At Act 408, a second conductive structure (e.g., conductive structure 219 of FIG. 3B) coupling the photodetector to the frontside surface of the photonic IC structure is formed. FIG. 3B illustrates a cross-sectional view of some embodiments corresponding to Acts 406 and 408.

At Act 410, a reflector (e.g., reflector 123 of FIG. 3B) is formed at the frontside surface of the photonic IC structure. In some embodiments, the reflector may be configured to reflect first light received from the inverse grating coupler back to the inverse grating coupler. FIG. 3B illustrates a cross-sectional view of some embodiments corresponding to Act 410.

At Act 412, an electrical IC die (e.g., E-IC die 103 of FIG. 3D) is created that includes a conductive layer (e.g., conductive layer 206A of FIG. 3C). At Act 414, a backside surface of the electrical IC die is bonded to the frontside surface of the photonic IC structure to couple the conductive layer to the first conductive structure and the second conductive structure. FIGS. 3C and 3D illustrate cross-sectional views of some embodiments corresponding to Acts 412 and 414.

At Act 416, an optical lens (e.g., lens layer 110 of FIGS. 3E and 3F) is bonded to a frontside surface of an electrical IC structure (e.g., E-IC structure 104) that includes the electrical IC die. In some embodiments, the optical lens may be configured to direct second light via the electrical IC structure to the grating coupler. FIGS. 3E and 3F illustrate cross-sectional views of some embodiments corresponding to Act 416.

At Act 418, a via (e.g., via 208A of FIG. 3F) is formed in the substrate of the photonic IC structure by way of a backside surface of the photonic IC structure. FIG. 3F illustrates a cross-sectional view of some embodiments corresponding to Act 418.

At Act 420, a contact (e.g., contact 212A of FIG. 3G) is formed over the backside surface of the photonic IC structure to couple the contact to the second conductive structure. FIG. 3G illustrates a cross-sectional view of some embodiments corresponding to Act 418.

FIGS. 5A-5F illustrate cross-sectional views of some embodiments of a semiconductor structure including a grating coupler and an inverse grating coupler for an IC device that facilitates same-side electrical and optical testing at various stages of manufacture. Although FIGS. 5A-5F are described as a series of acts, it will be appreciated that these acts are not limiting in that the order of the acts can be altered in other embodiments, and the methods disclosed are also applicable to other structures. In other embodiments, some acts that are illustrated and/or described may be omitted in whole or in part.

Figure 5A:
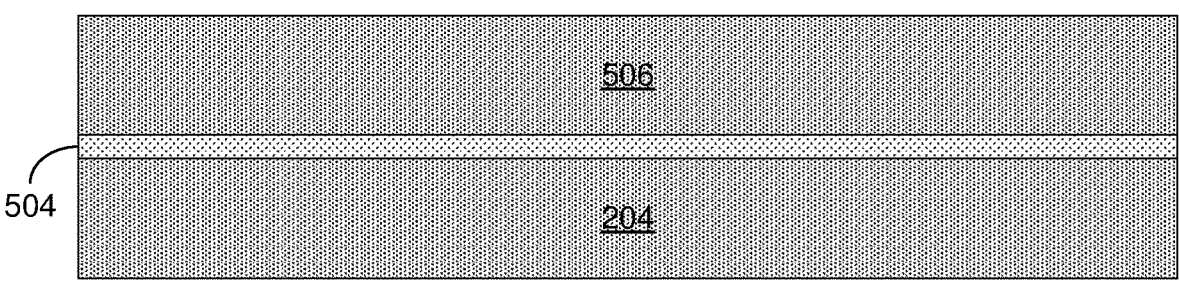
FIGS. 5A through 5F illustrate cross-sectional views of some embodiments of a semiconductor structure including a grating coupler and an inverse grating coupler for an IC device that facilitates same-side electrical and optical testing, according to the present disclosure.

FIG. 5A illustrates a substrate 204 (e.g., substrate 204 of FIG. 3A) which may be referred to as a first semiconductor layer (e.g., silicon). In some embodiments, a thickness of substrate 204 may be in the range of 500-1000 μm in some embodiments, and may be approximately 775 μm in some embodiments. Further, a first dielectric layer 504 (e.g., SiOx or another dielectric material) is disposed over substrate 204. A thickness of first dielectric layer 504 may be in the range of 0.6-3.0 μm in some embodiments and may be approximately 2.0 μm in some embodiments. Additionally, in some embodiments, a second semiconductor layer 506 (e.g., epitaxial silicon) may be disposed over first dielectric layer 504. A thickness of second semiconductor layer 506 may be in the range of 2500-3000 angstroms in some embodiments and may be in the range of approximately 2750 angstroms in some embodiments.

Figure 5B:
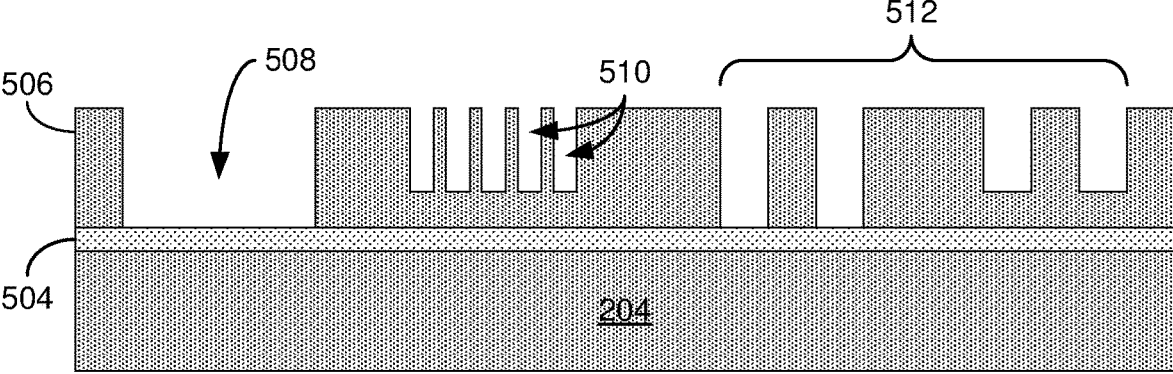

FIG. 5B illustrates the forming (e.g., etching) of a single region 508, a plurality of individual trenches 510, and a plurality of features 512 into second semiconductor layer 506. In some embodiments, single region 508 corresponds with inverse grating coupler 126, the plurality of trenches 510 corresponds with grating coupler 124, and the plurality of features 512 may be associated with other structures of P-IC structure 106 (e.g., at least one waveguide coupling grating coupler 124 and/or inverse grating coupler 126 to PD 122 of FIG. 2).

Figure 5C:
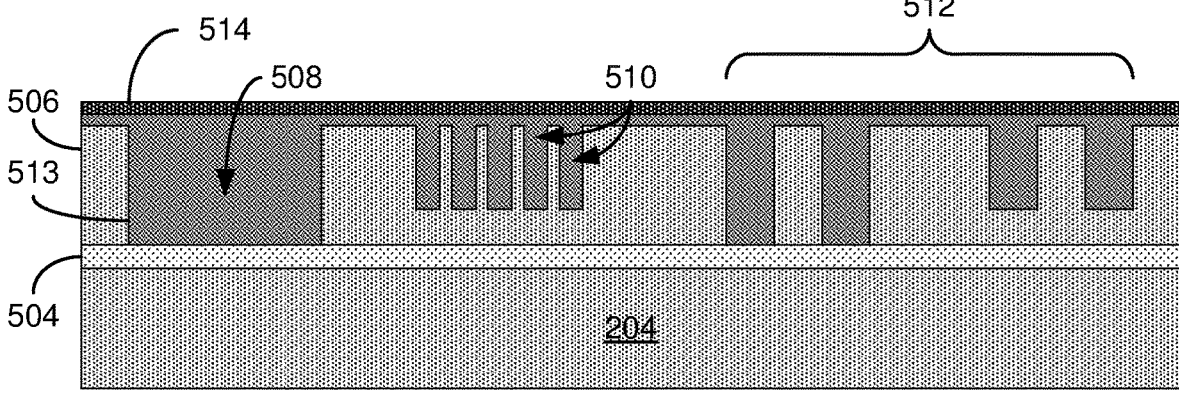

FIG. 5C illustrates the forming (e.g., deposition) of dielectric material 513 (e.g., SiOx) in single region 508, the plurality of individual trenches 510, and the plurality of features 512. In some embodiments, dielectric material 513 may also form a second dielectric layer over each of single region 508, the plurality of individual trenches 510, and the plurality of features 512, thus covering an entirety of second semiconductor layer 506. Further, in some embodiments, an etch stop layer (e.g., silicon nitride (SiN)) 514 may be formed (e.g., deposited) over dielectric material 513.

Figure 5D:
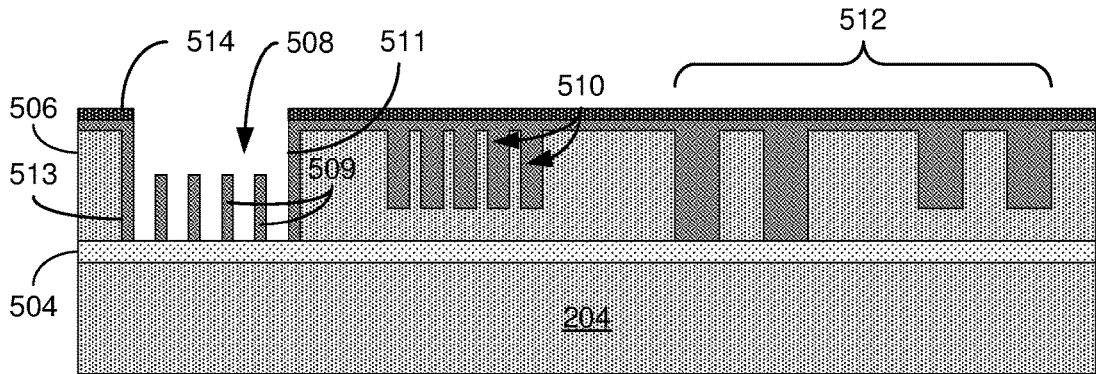

FIG. 5D illustrates the forming (e.g., etching) of single region 508, leaving a sidewall 511 and a plurality of individual ridges 509 of the dielectric material 513. In some embodiments, the plurality of individual ridges 509 extend from first dielectric layer 504 partially into single region 508. In some embodiments, etch stop layer 514 may be patterned to facilitate penetration during etching of single region 508.

Figure 5E:
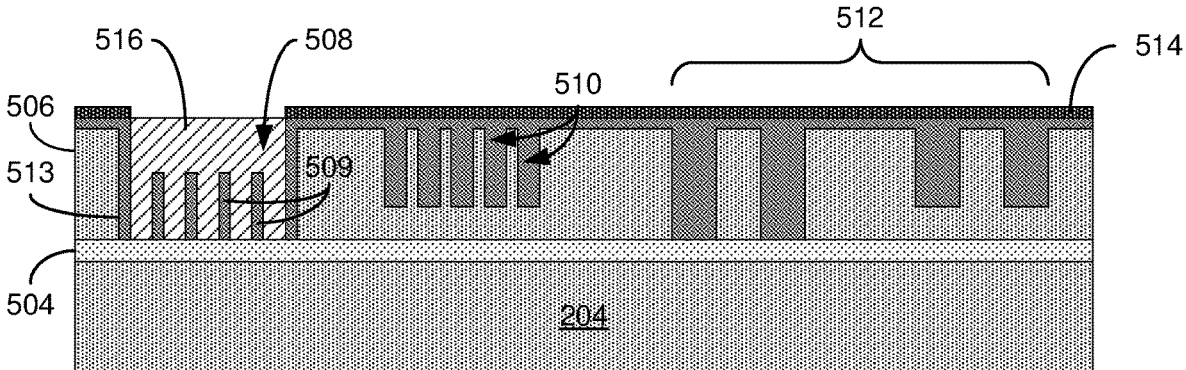
Figure 5F:
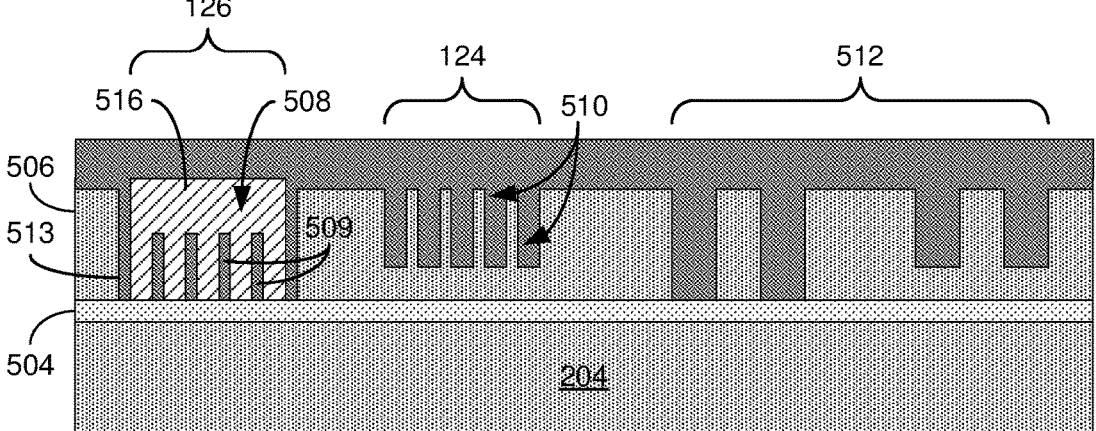

FIG. 5E illustrates a forming (e.g., deposition) of polycrystalline silicon 516 to fill the etched single region 508. In some embodiments, an upper surface of polycrystalline silicon 516 substantially matches an upper surface of the second dielectric layer of dielectric material 513.

FIG. 5F illustrates a removal of the etch stop layer 514, thus leaving an upper surface of the second dielectric layer of dielectric material 513 exposed. Further, in some embodiments, additional dielectric material 513 may be added (e.g., deposited) over previously formed dielectric material 513 and polycrystalline silicon 516. In some embodiments, the structure in single region 508 results in inverse grating coupler 126, while the structure associated with the plurality of individual trenches 510 results in grating coupler 124.

Figure 6:
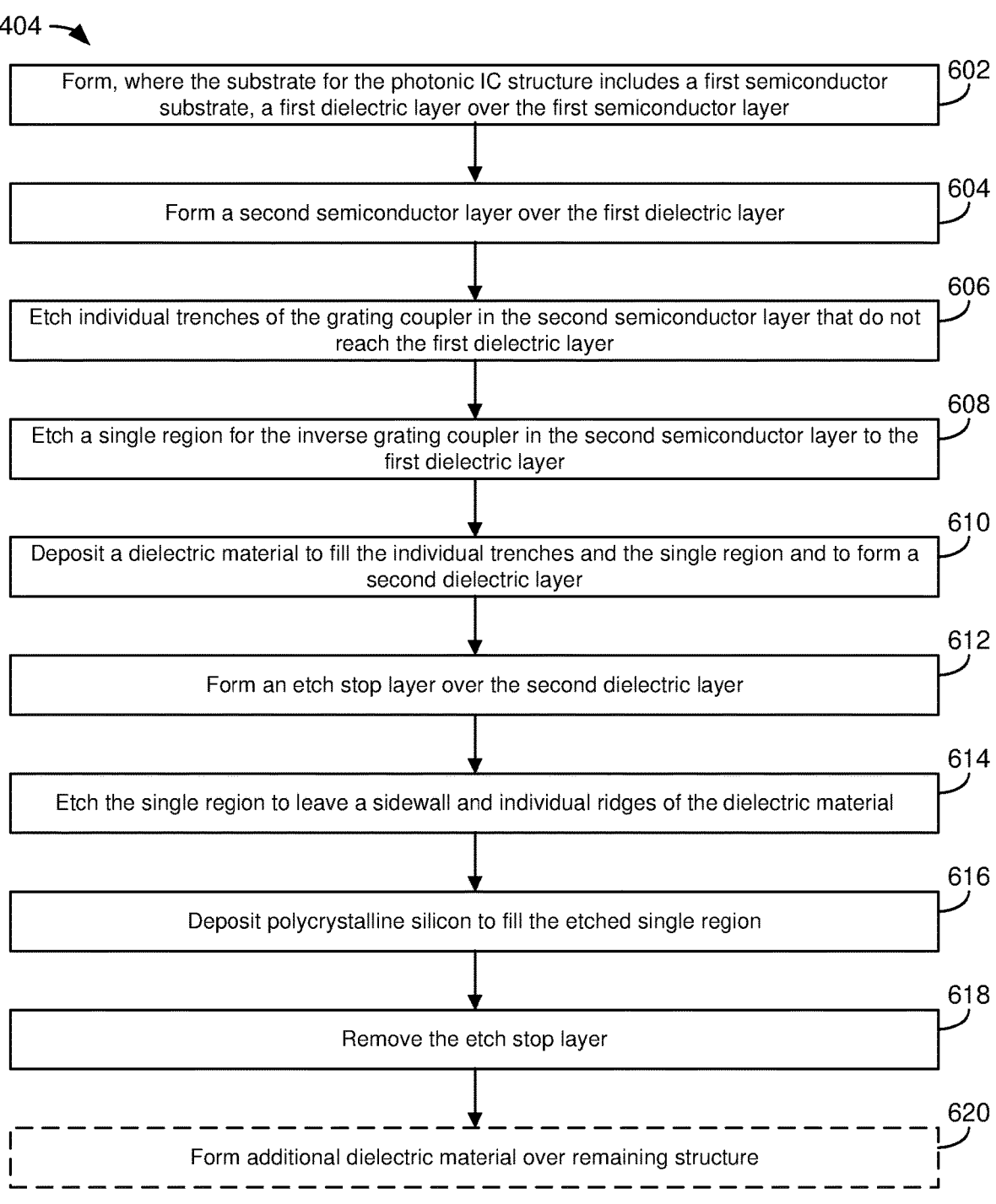
FIG. 6 illustrates a methodology of forming the semiconductor structure of FIGS. 5A through 5F, in accordance with some embodiments.

FIG. 6 illustrates a methodology of forming the semiconductor structure of FIGS. 5A through 5F, in accordance with some embodiments. Accordingly, in some embodiments, Acts 602-620 may correspond to Act 404 of FIG. 4. At Act 602, for example, a first dielectric layer (e.g., first dielectric layer 504 of FIG. 5A) is formed over the substrate (e.g., substrate 204, which includes a first semiconductor substrate) of P-IC 106. Also, at Act 604, a second semiconductor layer (e.g., second semiconductor layer 506 of FIG. 5A) is formed over the second semiconductor layer 506. FIG. 5A illustrates a cross-sectional view of some embodiments corresponding to Acts 602 and 604.

At Act 606, a plurality of individual trenches (e.g., plurality of individual trenches 510 of FIG. 5B) of the grating coupler (e.g., grating coupler 124 of FIG. 2) is etched in the second semiconductor layer that do not reach the first dielectric layer. Also, at Act 608, a single region (e.g., single region 508 of FIG. 5B) for the inverse grating coupler (e.g., inverse grating coupler 126 of FIG. 2) is etched in the second semiconductor layer to the first dielectric layer. FIG. 5B illustrates a cross-sectional view of some embodiments corresponding to Acts 606 and 608.

At Act 610, a dielectric material (e.g., dielectric material 513 of FIG. 5C) is deposited to fill the plurality of individual trenches and the single region and to form a second dielectric layer. Also, at Act 612, an etch stop layer (e.g., etch stop layer 514 of FIG. 5C) is deposited over the second dielectric layer. FIG. 5C illustrates a cross-sectional view of some embodiments corresponding to Acts 610 and 612.

At Act 614, the single region is etched to leave a sidewall (e.g., sidewall 511 of FIG. 5D) and a plurality of individual ridges (e.g., plurality of individual ridges 509 of FIG. 5D) of the dielectric material. FIG. 5D illustrates a cross-sectional view of some embodiments corresponding to Act 614.

At Act 616, polycrystalline silicon (e.g., polycrystalline silicon 516 of FIG. 5E) is deposited to fill the etched single region. FIG. 5E illustrates a cross-sectional view of some embodiments corresponding to Act 616.

At Act 618, the etch stop layer may be removed. In some embodiments, such removal may leave an upper surface of the second dielectric layer of the dielectric material exposed. Further, at Act 620, in some embodiments, additional dielectric material may be formed over the remaining structure. FIG. 5F illustrates a cross-sectional view of some embodiments corresponding to Acts 618 and 620.

Figure 7A:
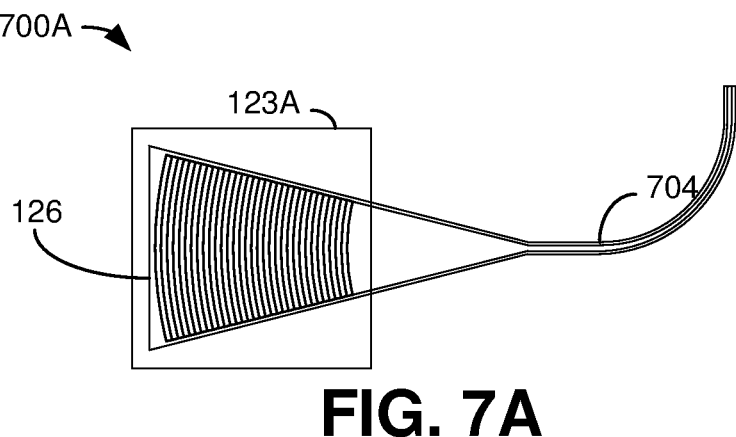
FIGS. 7A through 7C illustrate a plan view of some embodiments of an inverse grating coupler and associated reflector for an IC device that facilitates same-side electrical and optical testing, according to the present disclosure.
Figure 7B:
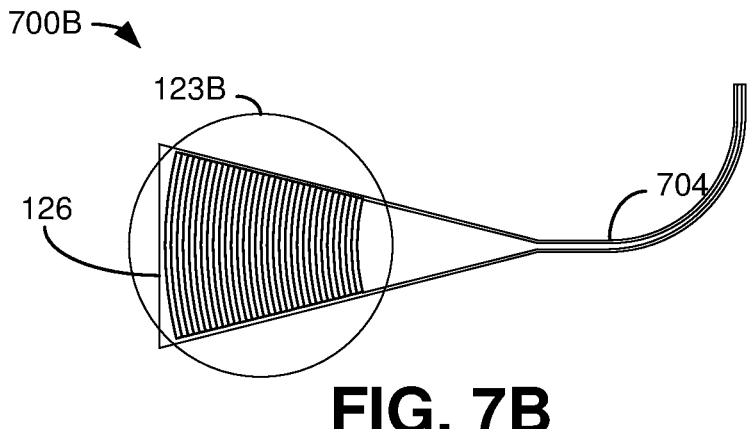
Figure 7C:
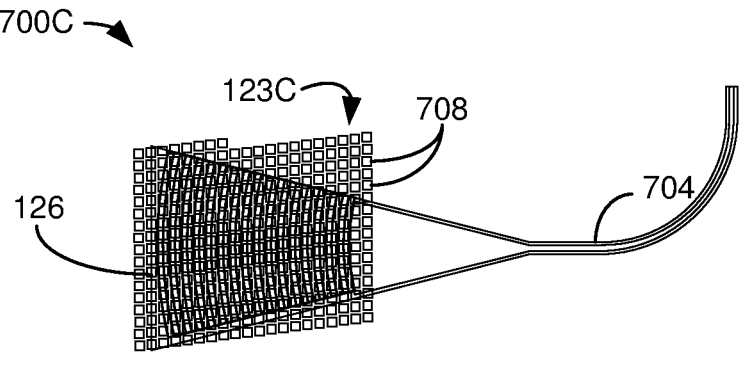

FIGS. 7A through 7C illustrate a plan view in some embodiments of inverse grating coupler 126 and associated reflector 123 for IC device 112 of FIG. 2 that facilitates same-side electrical and optical testing, according to the present disclosure. In each of FIGS. 7A-7C, in some embodiments, inverse grating coupler 126 may include a semicircular series of grating elements (e.g., individual ridges 509 of FIGS. 5D-5F) that describe an overall wedge shape and that direct light received at inverse grating coupler 126 to a waveguide 704 that is coupled to a pointed end of inverse grating coupler 126 (e.g., for transmission to PD 122 of FIG. 2). However, other configurations for inverse grating coupler 126 are possible in other embodiments.

In FIG. 7A, in some embodiments of a configuration 700A, the reflector may be configured as a single contiguous square reflective element 123A that fully or substantially covers inverse grating coupler 126. In FIG. 7B, in some embodiments of a configuration 700B, the reflector may be configured as a single contiguous circular reflective element 123B that fully or substantially covers inverse grating coupler 126. In other embodiments, other shapes (e.g., hexagonal, octagonal, and so on) may be employed as a single reflective element for the reflector.

In FIG. 7C, in some embodiments of a configuration 700C, the reflector may be configured as a two-dimensional array 123C of individual spaced reflective elements 708. As depicted in FIG. 7C, reflective elements 708 are square, although other shapes (e.g., rectangular, circular, and the like) are possible in other embodiments. In FIG. 7C, the two axes defining two-dimensional array 123C are not oriented 90 degrees apart, resulting in a skewed alignment of the rows of two-dimensional array 123C. However, in other embodiments, a 90 degree separation between such axes is also possible.

Some embodiments relate to an integrated circuit (IC) device. The device includes a first substrate including an optical lens at a top surface of the first substrate, an electrical IC structure disposed under the first substrate, and a photonic IC structure disposed under the electrical IC structure. The photonic IC structure includes a second substrate providing a bottom surface of the photonic IC structure; a photodetector, a grating coupler, and an inverse grating coupler disposed on the second substrate; and a reflector disposed at a top surface of the photonic IC structure proximate the electrical IC structure. The grating coupler is configured to receive first light via the optical lens, the first substrate, and the electrical IC structure and to direct the first light to the photodetector. The inverse grating coupler is configured to receive second light via a backside surface of the second substrate and to direct the second light to the photodetector. The reflector is configured to receive third light from the inverse grating coupler and to direct the third light back to the inverse grating coupler, wherein the inverse grating coupler is further configured to direct the third light to the photodetector.

Some embodiments relate to another IC device. The device includes an electrical IC structure including a conductive layer, an optical lens disposed proximate a frontside surface of the electrical IC structure, a photonic IC structure disposed proximate a backside surface of the electrical IC structure, and a contact. The photonic IC structure includes a photodetector; a grating coupler optically coupled to the photodetector and configured to direct first light received from the optical lens; an inverse grating coupler optically coupled to the photodetector and configured to direct second light received from a backside surface of the photonic IC structure to the photodetector; a reflector configured to reflect third light from the inverse grating coupler back to the inverse grating coupler, wherein the inverse grating coupler directs the third light to the photodetector; and a first conductive structure coupling the photodetector to the conductive layer. The contact is disposed proximate the backside surface of the photonic IC structure and coupled to a second conductive structure of the photonic IC structure coupling the contact to the conductive layer.

Some embodiments relate to a method. The method includes providing a substrate for a photonic IC structure; forming a grating coupler, an inverse grating coupler, and a photodetector over the substrate, the grating coupler and the inverse grating coupler optically coupled to the photodetector; forming a first conductive structure coupling the photodetector to a frontside surface of the photonic IC structure; forming a second conductive structure coupled to the frontside surface of the photonic IC structure; forming a reflector at the frontside surface of the photonic IC structure, the reflector configured to reflect first light received from the inverse grating coupler back to the inverse grating coupler; creating an electrical IC structure including a conductive layer; bonding a backside surface of the electrical IC structure to the frontside surface of the photonic IC structure to couple the conductive layer to the first conductive structure and the second conductive structure; and bonding an optical lens to a frontside surface of the electrical IC structure, the optical lens configured to direct second light via the electrical IC structure to the grating coupler.

It will be appreciated that in this written description, as well as in the claims below, the terms "first", "second", "second", "third" etc. are merely generic identifiers used for ease of description to distinguish between different elements of a figure or a series of figures. In and of themselves, these terms do not imply any temporal ordering or structural proximity for these elements, and are not intended to be descriptive of corresponding elements in different illustrated embodiments and/or un-illustrated embodiments. For example, "a first dielectric layer" described in connection with a first figure may not necessarily correspond to a "first dielectric layer" described in connection with another figure, and may not necessarily correspond to a "first dielectric layer" in an un-illustrated embodiment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device, comprising:
a first substrate comprising an optical lens at a top surface of the first substrate;
an electrical IC structure disposed under the first substrate; and
a photonic IC structure disposed under the electrical IC structure, the photonic IC structure comprising:
a second substrate providing a bottom surface of the photonic IC structure;
a photodetector, a grating coupler, and an inverse grating coupler disposed on the second substrate; and
a reflector disposed at a top surface of the photonic IC structure proximate the electrical IC structure;

wherein:
the grating coupler is configured to receive first light via the optical lens, the first substrate, and the electrical IC structure and to direct the first light to the photodetector;
the inverse grating coupler is configured to receive second light via a backside surface of the second substrate and to direct the second light to the photodetector; and
the reflector is configured to receive third light from the inverse grating coupler and to direct the third light back to the inverse grating coupler, wherein the inverse grating coupler is further configured to direct the third light to the photodetector.

2. The IC device of claim 1, wherein:
the photonic IC structure further comprises a conductive structure having a plurality of metal layers interconnected with a plurality of vias, the conductive structure configured to electrically couple the photodetector to the electrical IC structure; and
an uppermost metal layer of the plurality of metal layers lies in a same plane as the reflector.

3. The IC device of claim 2, wherein the reflector is electrically isolated from the conductive structure.

4. The IC device of claim 1, wherein the reflector comprises at least one of titanium or an aluminum-copper alloy.

5. The IC device of claim 1, wherein a thickness of the reflector ranges from 1000 angstroms to 14000 angstroms.

6. The IC device of claim 1, wherein at least one of a width and a length of the reflector ranges from 20 microns to 100 microns.

7. The IC device of claim 1, wherein the reflector is aligned with the inverse grating coupler in a plan view of the IC device.

8. The IC device of claim 1, wherein the reflector is a single contiguous reflective element in a plan view of the IC device.

9. The IC device of claim 1, wherein the reflector comprises a two-dimensional array of spaced reflective elements.

10. An integrated circuit (IC) device, comprising:
an electrical IC structure comprising a conductive layer;
an optical lens disposed proximate a frontside surface of the electrical IC structure;
a photonic IC structure disposed proximate a backside surface of the electrical IC structure, the photonic IC structure comprising:
a photodetector;
a grating coupler optically coupled to the photodetector and configured to direct first light received from the optical lens;
an inverse grating coupler optically coupled to the photodetector and configured to direct second light received from a backside surface of the photonic IC structure to the photodetector;
a reflector configured to reflect third light from the inverse grating coupler back to the inverse grating coupler, wherein the inverse grating coupler directs the third light to the photodetector; and
a first conductive structure coupling the photodetector to the conductive layer; and
a contact disposed proximate the backside surface of the photonic IC structure and coupled to a second conductive structure of the photonic IC structure coupling the contact to the conductive layer.

11. The IC device of claim 10, wherein:

the electrical IC structure comprises an electrical IC die; and a plurality of electrical IC dice comprises the electrical IC die; and each of the plurality of electrical IC dice are bonded to the photonic IC structure.

12. The IC device of claim 10, further comprising:

a first waveguide configured to optically couple the grating coupler to the photodetector; and a second waveguide configured to optically couple the inverse grating coupler to the photodetector.

13. The IC device of claim 10, wherein:

none of the grating coupler, the inverse grating coupler, and the electrical IC structure overlap each other in a plan view of the IC device; and each of the grating coupler, the inverse grating coupler, and the electrical IC structure overlaps the photonic IC structure in the plan view of the IC device.

14. A method, comprising:

providing a substrate for a photonic IC structure;

forming a grating coupler, an inverse grating coupler, and a photodetector over the substrate, the grating coupler and the inverse grating coupler optically coupled to the photodetector;

forming a first conductive structure coupling the photodetector to a frontside surface of the photonic IC structure;

forming a second conductive structure coupled to the frontside surface of the photonic IC structure;

forming a reflector at the frontside surface of the photonic IC structure, the reflector configured to reflect first light received from the inverse grating coupler back to the inverse grating coupler;

creating an electrical IC die comprising a conductive layer;

bonding a backside surface of the electrical IC die to the frontside surface of the photonic IC structure to couple the conductive layer to the first conductive structure and the second conductive structure; and bonding an optical lens to a frontside surface of an electrical IC structure that includes the electrical IC die, the optical lens configured to direct second light via the electrical IC structure to the grating coupler.

15. The method of claim 14, wherein:

forming a via in the substrate of the photonic IC structure by way of a backside surface of the photonic IC structure; and forming a contact over the backside surface of the photonic IC structure to couple the contact to the second conductive structure.

16. The method of claim 14, wherein:

the reflector lies in a same plane as a layer of each of the first conductive structure and the second conductive structure; and the reflector is electrically isolated from both the first conductive structure and the second conductive structure.

17. The method of claim 14, wherein:

the substrate comprises a first semiconductor layer; and the method further comprises:

forming a first dielectric layer over the first semiconductor layer; and forming a second semiconductor layer over the first dielectric layer.

18. The method of claim 17, wherein forming the grating coupler and the inverse grating coupler comprises:

etching a plurality of individual trenches of the grating coupler in the second semiconductor layer that do not reach the first dielectric layer;

etching a single region for the inverse grating coupler in the second semiconductor layer to the first dielectric layer;

depositing a dielectric material to fill the plurality of individual trenches and the single region and to form a second dielectric layer;

forming an etch stop layer over the second dielectric layer;

etching the single region to leave a sidewall and a plurality of individual ridges of the dielectric material;

depositing polycrystalline silicon to fill the etched single region; and removing the etch stop layer.

19. The method of claim 18, wherein the plurality of individual ridges extend from the first dielectric layer partially into the single region.

20. The method of claim 18, wherein the reflector substantially covers the single region in a plan view of the photonic IC structure.

* * * * *